Sept. 17, 1929.   L. HAYD   1,728,758
NUT LOCK
Filed Jan. 22, 1927
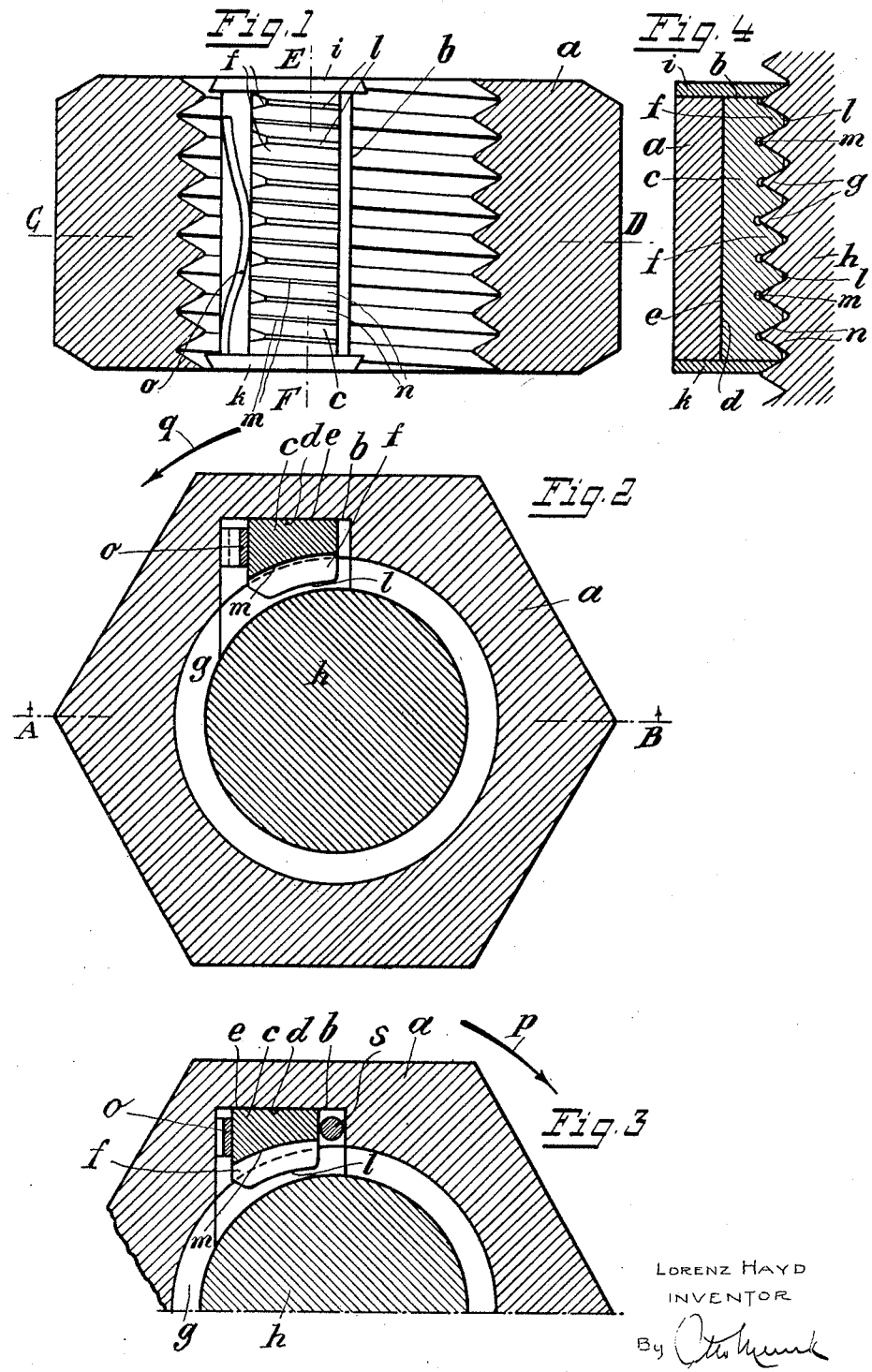
LORENZ HAYD
INVENTOR Patented Sept. 17, 1929

1,728,758

UNITED STATES PATENT OFFICE

LORENZ HAYD, OF MUNICH, GERMANY, ASSIGNOR OF ONE-HALF TO ARNO LUTZE, OF SEESHAUPT, BAVARIA, GERMANY

NUT LOCK

Application filed January 22, 1927, Serial No. 162,745, and in Germany February 5, 1926.

My invention relates to a nut lock in which the nut is provided with a recess parallel to the axis of the bolt or screw, the recess containing a locking member which, in locking position, has a broad surface engaging the rear wall of the recess and its full clamping surface in engagement with the threads of the bolt.

The principal advantage of this construction is that the clamping or engaging pressure is transmitted over relatively large surfaces whereby injury of the locking member and of the thread of the bolt is effectively prevented.

The invention is illustrated in the accompanying drawing, in which Fig. 1 is a section on the line A—B of Fig. 2; Fig. 2 is a section on the line C—D of Fig. 1; Fig. 3 is a view similar to Fig. 2 with the locking member in unlocking position and Fig. 4 is a section on the line E—F of Fig. 1.

Referring to the drawing, it will be noted that the nut $a$ is provided with a wedge shaped recess $b$ extending parallel to the axis of the bolt, and a locking member $c$ is movably arranged in the recess. The locking member $c$ has a broad surface $d$ in engagement with the rear face $e$ of the recess $b$, and opposite the surface $d$ the locking member has threads $f$ in engagement with the threads $g$ of the bolt $h$. The locking member $c$ has upper and lower plates $i$ and $k$ to prevent its falling out of the nut.

As shown most clearly in Fig. 4, the teeth or edges $l$ of the threads $f$ are blunt while the valleys or depressions of these threads are provided with relatively wide openings $m$, so that as a result of this construction transmission of clamping pressure from the bolt $h$ to the locking member $c$ is effected exclusively along the flanks $n$ of the threads and no strain whatever is placed on the points or teeth of the threads of the bolt $h$. A leaf spring $o$ in the recess $b$ tends to force the locking member $c$ into locking position and to retain it in such position.

It will be apparent that while normally the nut $a$ may be freely turned in the direction of the arrow $p$, turning thereof in the direction of arrow $q$ is only possible if the locking member is moved out of locking position in opposition to the spring $o$ and held out of locking position. The clamping pressure is transmitted by the broad surface $d$ to the rear wall $e$ of the recess $b$, and by the threaded face of the locking member $c$ to the bolt $h$. By virtue of the relatively large pressure surfaces there is no danger of injury to either the threads $g$ of the bolt $h$ or to the rear wall $e$ of the recess $b$ nor to the locking member itself.

Release of the locking member is effected by inserting into the recess $b$ a pin $s$ which presses the locking member in opposition to the spring, holding the locking member in a position in which it is incapable of exerting a clamping action whereby the nut $a$ may be turned in the direction of arrow $q$.

I claim:—

1. In combination with a threaded bolt and a nut threaded thereon, a recess extending along the threaded hole of the nut parallel to the axis, and having wedge-shaped cross-section, the rear wall of the said recess being plane and straight, and a locking member of wedge-shaped cross-section of lesser breadth than the said recess, inserted loosely into said recess, said locking member having a broad, plane and straight rear face in engagement with the rear wall of the recess, and a threaded front face adapted to engage throughout its full width with the threads of the bolt, a leaf spring inserted between the broader side wall of the locking member and the broader side wall of the recess; and an upper and a lower end plate fixed at the respective ends of the locking member and extending over the upper end and the lower end respectively, of the nut, so as to keep the locking member in the right longitudinal position within the said recess.

2. In combination with a threaded bolt and a nut threaded thereon, a recess extending along the threaded hole of the nut parallel to the axis, and having wedge-shaped cross-section, the rear wall of the said recess being plane and straight, and a locking member of wedge-shaped cross-section of lesser breadth than the said recess, inserted loosely into said recess, said locking member having a broad plane and straight rear face in engagement with the rear wall of the recess, and a threaded front face adapted to engage throughout its full width with the threads of the bolt; and said locking member having further blunt edges as its thread teeth and having undercut grooves between the bases of its teeth and means for pressing the locking member normally toward the narrower side of the wedge-shaped recess.

3. In a nut lock, the combination with an externally threaded bolt, of an internally threaded nut having a recess therein wedge shaped in cross section, parallel to and laterally of the central hole in the nut with its rear wall plane and straight, a locking member of less width than and loosely arranged within said recess, said locking member having its rear face plane and straight conforming to and designed to engage the rear face of the recess and having its front face provided with threads the flanks of which are adapted to engage the flanks of the threads in the bolt but the apices of which do not contact with the bottoms of the grooves between the threads of the bolt, and means for pressing the locking member normally into engagement with the nut.

In testimony whereof I hereunto affix my signature.

LORENZ HAYD.